US011072146B2

(12) United States Patent
Forest

(10) Patent No.: US 11,072,146 B2
(45) Date of Patent: Jul. 27, 2021

(54) COMPOSITE SHEET MADE FROM FABRIC AND POLYETHERIMIDE WITH CONTROLLED POROSITY

(71) Applicant: PORCHER INDUSTRIES, Badinières (FR)

(72) Inventor: Eric Forest, Chélieu (FR)

(73) Assignee: PORCHER INDUSTRIES, Badinières (FR)

( * ) Notice: Subject to any disclaimer, the term of this patent is extended or adjusted under 35 U.S.C. 154(b) by 132 days.

(21) Appl. No.: 16/313,427

(22) PCT Filed: Jul. 5, 2017

(86) PCT No.: PCT/EP2017/066811
§ 371 (c)(1),
(2) Date: Dec. 26, 2018

(87) PCT Pub. No.: WO2018/007460
PCT Pub. Date: Jan. 11, 2018

(65) Prior Publication Data
US 2019/0160781 A1 May 30, 2019

(30) Foreign Application Priority Data
Jul. 5, 2016 (FR) ...................................... 1656394

(51) Int. Cl.
*B32B 27/12* (2006.01)
*B32B 5/26* (2006.01)
*B32B 5/02* (2006.01)
*C08J 5/04* (2006.01)
*B32B 38/08* (2006.01)

(52) U.S. Cl.
CPC ............... *B32B 5/26* (2013.01); *B32B 5/024* (2013.01); *B32B 38/08* (2013.01); *C08J 5/04* (2013.01); *C08J 5/043* (2013.01); *B32B 2260/021* (2013.01); *B32B 2260/046* (2013.01); *B32B 2305/188* (2013.01); *B32B 2307/718* (2013.01); *B32B 2307/7265* (2013.01); *B32B 2309/02* (2013.01); *B32B 2309/12* (2013.01); *B32B 2605/00* (2013.01); *B32B 2607/00* (2013.01); *C08J 2379/08* (2013.01)

(58) Field of Classification Search
CPC ...................................................... B32B 27/12
See application file for complete search history.

(56) References Cited

U.S. PATENT DOCUMENTS

| 4,889,763 | A | * | 12/1989 | Brambach | ................. | B32B 5/24 442/223 |
| 5,562,791 | A | * | 10/1996 | De Groot | ............ | B29C 44/1233 156/79 |
| 5,888,610 | A | * | 3/1999 | Fournier | ................... | E04B 1/86 156/292 |
| 6,401,414 | B1 | * | 6/2002 | Steel | ....................... | B32B 38/06 52/309.6 |
| 2006/0194070 | A1 | | 8/2006 | Croll et al. | | |
| 2007/0141304 | A1 | * | 6/2007 | Agrawal | ................ | E04C 2/043 428/138 |
| 2009/0075541 | A1 | * | 3/2009 | Zheng | ..................... | B32B 13/14 442/180 |
| 2013/0164524 | A1 | * | 6/2013 | Letts | ......................... | B32B 5/18 428/319.3 |
| 2013/0220195 | A1 | | 8/2013 | Sjostedt | | |
| 2013/0260123 | A1 | | 10/2013 | Krahn et al. | | |
| 2014/0162020 | A1 | | 6/2014 | Wang et al. | | |
| 2015/0211154 | A1 | | 7/2015 | Hightower et al. | | |
| 2016/0053118 | A1 | | 2/2016 | Nair et al. | | |

FOREIGN PATENT DOCUMENTS

| EP | 0745640 A1 | 12/1996 |
| WO | 2016055926 A1 | 4/2016 |

OTHER PUBLICATIONS

French Patent Application No. 1656394, INPI Rapport de Recherche Préliminaire, Oct. 5, 2016, 2 pp.
International Application No. PCT/EP2017/066811, International Search Report, dated Jul. 25, 2017, 3 pp.

* cited by examiner

*Primary Examiner* — Andrew T Piziali
(74) *Attorney, Agent, or Firm* — Soquel Group LLC

(57) ABSTRACT

A composite sheet including at least a textile structure and a polyetherimide (PEI), the latter impregnating and densifying the textile structure, the sheet having a porosity of between approximately 3% and approximately 8% by mass of acetone sorption, and preferably between approximately 4% and approximately 5%, as measured by the acetone uptake method; the manufacturing method including continuous or semi-continuous molding; the sheet being used inter alia as a skin of a foamed structure made from PEI.

21 Claims, No Drawings

COMPOSITE SHEET MADE FROM FABRIC AND POLYETHERIMIDE WITH CONTROLLED POROSITY

CROSS-REFERENCE TO RELATED APPLICATIONS

This application claims benefit under 35 USC § 371 of PCT Application No. PCT/EP2017/066811 entitled COMPOSITE SHEET MADE FROM FABRIC AND POLYETHERIMIDE WITH CONTROLLED POROSOTY, filed on Jul. 5, 2017 by inventor Eric Forest. PCT Application No. PCT/EP2017/066811 claims priority of French Patent Application No. 16 56394, filed on Jul. 5, 2016.

FIELD OF THE INVENTION

The present invention relates to a composite sheet of controlled porosity comprising a textile structure and polyetherimide (PEI), which is used, in particular, to serve as skin with controlled porosity in an in situ foaming method of thermoplastic materials. It also relates to a method for producing such sheets and their use in the manufacture of sandwich panels with a foamed core.

BACKGROUND OF THE INVENTION

The in situ foaming method is based on the use of "facings" or "skins" and a layer or film of thermoplastic polymeric material in the presence of a foaming agent, and making it possible to produce a sandwich panel with a foamed core. The in situ method makes it possible to achieve, in a single step, adhesion between the skins and the foam that forms, in particular when the skins comprise a compatible polymer material of the same nature as, or identical with, the polymer material of the foam, allowing various adhesion mechanisms to be obtained such as mechanical interlocking, self-adhesion through bonds between the polymer chains, adsorption (interatomic or intermolecular forces).

A typical example is a sandwich comprising a polyetherimide-based foam and composite skins of glass fabric and thermoplastic polymer, which may also be PEI. The method comprises stacking two or more sheets of PEI-impregnated glass fabric, optionally in the presence of an impregnating solvent, and one or more plies of PEI film in the presence of a foaming agent (typically acetone), precompacting, heating with gradual opening allowing the foaming, and the expansion of the foam. The foaming solvent is present in a significant quantity, typically about 20% by weight of the core, and one of the difficulties is to control its evacuation. Acetone may, in particular, have a tendency to soften the skins, to generate surface defects as well as poor tension of these skins on the surface of the sandwich, and to limit the adhesion between the foam and the skins, leading to harmful consequences with respect to the mechanical performance.

SUMMARY OF THE DESCRIPTION

The invention aims to provide a composite sheet mono or multilayer textile structure/PEI of controlled porosity, in particular to solve these problems.

Another object of the invention is to provide such a sheet that may be used, in particular, to serve as a skin in an in-situ foaming method of PEI-based thermoplastic materials, allowing optimal evacuation of the gases during the foaming process, in particular the acetone, in order to obtain a skin without surface defects and with good tension.

Another object of the invention is to provide a method for obtaining such a composite sheet.

DETAILED DESCRIPTION

These objectives are achieved, in particular, according to a first embodiment, by a composite sheet comprising at least one textile structure and a polyetherimide (PEI), wherein the latter impregnates and densifies (consolidates) the textile structure, and wherein the composite sheet has a certain porosity to acetone. Preferably, the composite sheet has an acetone porosity of between about 3% and about 8% by weight of acetone absorption (greater than 99% pure), preferably between about 4% and about 5%, such as may be measured by the acetone uptake method consisting in, preparing a 40×40 mm test piece of the composite sheet, dried for 2 h at 70° C., weighing the initial mass of the test piece, then placing the test piece in the acetone overlay for 24 hours, recovering the test piece, wiping it and weighing it, comparing it with the initial mass and deducting the intake of acetone uptake as a mass.

According to a second embodiment, these objectives may also be achieved from a composite sheet comprising at least one textile structure and a polyetherimide (PEI), wherein the latter impregnates and densifies (consolidates) the textile structure, wherein the latter is of the type prepared by a method comprising having one ply of fabric or a plurality of superimposed plies of fabric, impregnating it/them with PEI by powdering (powder coating) or depositing a PEI film on one or both sides of the fabric or stack, subjecting the stack to softening, then cooling and consolidation, using continuous or semi-continuous molding. This continuous or semi-continuous molding may be carried out with heating at a temperature of between about 300 and about 500° C., in particular between about 360 and about 400° C., for a period between about 30 s and about 3 min. More detailed method data is given below for each of the continuous and semi-continuous modes.

In a third embodiment, the two preceding embodiments are combined, wherein the composite sheet is produced by continuous or semi-continuous molding according to the second embodiment and has the acetone porosity of the first embodiment. In addition, the following additional features apply to each of these three embodiments.

The mass content of PEI relative to the total weight of the sheet may be, in particular, between about 20 and about 50%, preferably between about 23 and about 43%, more preferably between about 30 and about 36%, for example about 33%.

This mass content should be as regular as possible in order to obtain a homogeneous sheet with a porosity that is evenly distributed throughout the sheet. Thus, according to one characteristic of the invention, the mass content of PEI has a regularity of +/−5%, preferably +/−3%, better still +/−2%, or even less, of resin mass on/in the whole sheet. The regularity may be measured according to standard EN2331, calcination method (NF EN 2331 May 1993, Aerospace series—Textile glass fiber prepregs—Test method for the determination of resin and fiber contents and the fiber mass per unit area).

In a preferred embodiment, the composite sheet comprises at least one textile structure and a polyetherimide (PEI), wherein the latter impregnates and densifies (consolidates) the textile structure, and wherein the mass content of PEI relative to the total weight of the sheet is comprised between about 20 and about 50%, preferably between about 23 and about 43%, more preferably between about 30 and about 36%, for example about 33%, wherein the mass content of PEI has a regularity of +/−5%, preferably +/−3%, more preferably +/−2%, or less, by mass of resin on/in the whole of the sheet, while the sheet has a porosity of between about 3% and about 8% by weight of acetone absorption, preferably between about 4% and about 5%, as measured by the acetone uptake method.

The textile or fabric structure may in particular be formed by glass, carbon, basalt and blends, for example glass/carbon.

The mass surface area of the glass fabric may be, in particular, between about 50 and about 600 g/m$^2$, preferably between about 100 and about 400 g/m$^2$.

The glass threads may have, in particular, a titration of 10 to 300 tex, while the carbon threads may have, in particular, a titration of 60 to 800 tex.

The sheet may comprise, in particular, from 1 to 4 plies of textile structure.

The sheet may have, in particular, a thickness less than or equal to about 3 mm, in particular 2 mm.

There are several grades for PEI corresponding to different macromolecular chain lengths and therefore different viscosities. The longer the chains, the more the thermoplastic resins have high viscosities. The PEI is formed from the following monomeric units:

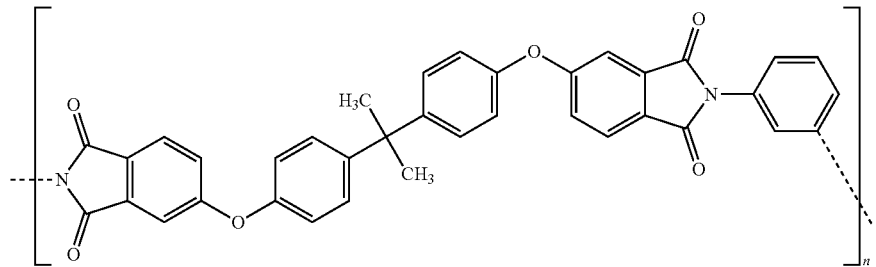

The monomer has a molecular weight of 592.61 g/mol. According to the present invention, use may be made, in particular, of a PEI of a grade, as defined by the weight-average molar mass (MW), of between about 20,000 and about 100,000 g/mol, preferably between about 30,000 and about 100,000 g/mol. mol, in particular between about 30,000 and about 60,000 g/mol; for example, about 47,000 or 55,000 g/mol.

According to the present invention, use may be made, in particular, of a PEI of grade, as defined by the number-average molar mass (Mn), of between about 15,000 and about 50,000 g/mol, preferably between about 18,000 and about 30,000 g/mol; for example, about 28,000 g/mol.

The measurement method used to determine the grades of PEI is, in the usual way, gel permeation chromatography (GPC). By way of example, mention may be made of GPC calibrated with PMMA, and, in particular, the following. About 25 mg of sample are weighed exactly. 10 ml of HFiP eluent are added. The dissolution is carried out at ambient temperature for 24 hours. The method preferably uses 3 columns for greater precision. The molar masses are calculated conventionally under PMMA narrow calibration. The following eluent may be used: HFiP (hexafluoroisopropanol)—0.1 M KTFA (potassium trifluoroacetate). The following details may be provided:

Flow rate: 1 ml/min
T° C. analysis: 40° C.
Concentration: exact concentration injected at around 2.7 g/l
Injection volume: 100 μl
Columns: 3 columns: 10 μm, 1000 Å, 8.0 mm×100 mm; 10 μm, 1000 Å, 8.0 mm×300 mm; 10 μm, 100 Å, 8.0 mm×300 mm
Detection (s): RI (refractive index)
Calibration: narrow standards of PMMA (polymethyl methacrylate).

The fabric, in particular glass fabric, used during the impregnation with the PEI may be ecru, i.e. a sized fabric (the term sizing includes the term bonding). It may also be a desized fabric (including de-bonding), in particular by a heat treatment (for example at about 400° C. in an oven for about 72 hours).

The ecru or desized fabric may be processed by so-called finishing or finish, which has been found to improve compatibility and fabric-polymer adhesion, resulting in a substantial improvement in mechanical performance in traction and flexion. The following products are very suitable: aminosilanes (for example AMEO from Evonik), epoxysilanes (for example Silquest® A-1871 from Monentive Performance Materials). The fabric and therefore the composite sheet according to the invention may therefore comprise one of these products. The implementation may be carried out by bathing or spraying, for example.

As for the weave of the textile structure, there are no limitations. In particular, mention may be made of twill, in particular for the flat appearance of the textile structure, and satin, in particular for better drapability. Three different weaves and contextures were tested with Ec9 68tex glass: 8H satin of 305 g/m$^2$ 23×21 yarn/cm; satin of 4H of 220 g/m$^2$ 19.5×12 yarn/cm; and twill 2/2 270 g/m$^2$ 22/16 yarn/cm. The different grammages make it possible to obtain different thicknesses and therefore different mechanical performances for composite sheets of one or more plies.

As will be further detailed below, in the sheet according to the invention, the impregnation of the textile structure by the PEI may have been obtained, in particular, by depositing the PEI on both sides of the textile structure by powdering or in the form of films.

The present invention also relates to a method of manufacturing a composite sheet according to the invention, while the composite sheet may also be defined by its method of being obtained.

In one embodiment, the PEI is deposited on one or both sides of the textile structure, and this may be advantageously achieved by powdering the PEI. Conventional powdering methods, such as gravitational powdering and electrostatic powdering, may be used. Once the powdering is completed, the assembly is pressed or calendered at a temperature above the softening temperature of the PEI.

In another embodiment, it is possible to use PEI films, which may be deposited on one or both sides of the textile structure, wherein the assembly is conventionally carried out by pressing or calendering at a temperature above the softening temperature of the PEI.

The softening temperature or Tg may be, in particular, of the order of 205 to 220° C. for the PEI as a function of the grades. However, in order to obtain adequate viscosities, in particular less than or equal to 1000 Pa·s, preferably 600 Pa·s in the melt, it is preferable to heat between about 300 and about 500° C., in particular between about 360 and about 400° C. Traditionally, the consolidation of a textile coated with polymer powder or laminated with a film, is performed statically in a press without shear or dynamically (with a running speed <20 m/min) under a negligible shear due to the wide air gap. The viscosity values are therefore given here at the indicated melt temperature, at almost zero shear, namely, in particular, between $10^{-2}$ and 1 second$^{-1}$. The measurement may be carried out using a two-plane Couette viscometer (wherein the polymer is placed between two planes).

Preferably, PEI resins having an apparent viscosity of between 600 and 1500 Pa·s, in particular between 800 and 1200 Pa·s at 360° C., as measured under virtually zero shear, namely between $10^{-2}$ and 1 second$^{-1}$, are preferably used. The measurement may be made using a two-plane Couette viscometer.

The deposition conditions of the invention make it possible to obtain the mass content of PEI with respect to the total weight of the sheet of between about 20 and about 50%, preferably between about 23 and about 43%, better still between about 30% and about 36%, for example about 33%, wherein the mass content of PEI has a regularity of +/−5%, preferably +/−3%, better +/−2%, better still +/−1% or even less, in mass of resin on the whole of the sheet.

Once the textile structure is impregnated with PEI in a regular manner, the consolidation or densification is carried out under conditions that make it possible to obtain the level of regular porosity in accordance with the invention.

The consolidation is carried out under conditions of adequate viscosity. This viscosity may be, in particular, less than or equal to 1000 Pa·s in the melt, preferably less than or equal to 600 Pa·s (almost zero shear measurement conditions, see above). The temperature may be, in particular, between about 300 and about 500° C., in particular between about 360 and about 400° C., in particular as a function of the grade of PEI used, in order to obtain this viscosity. To avoid degradation of the PEI at these temperatures, it is then preferred to use rapid molding or consolidation methods, namely continuous molding (consolidation) or semi-continuous molding (consolidation). The duration of treatment at elevated temperature may be, in particular, limited to a duration of between about 30 seconds and about 3 minutes.

In particular, either of two consolidation technologies may be used. These two technologies are not static, but are continuous or semi-continuous, and integrate a certain passage speed under pressure and high temperature.

The consolidation according to a continuous technology, in which a pressure may be applied between about 20 and about 100 bar, preferably between about 40 and about 80 bar, and a temperature between about 300 and about 500° C., in particular between about 360 and about 400° C., for a passage speed of about 0.1 to about 5 m/m in, preferably about 1 to about 2 m/m in, for a high temperature treatment duration of between about 30 sec and about 3 min.

The continuous technology of the isobaric type. This technology combines the effect of the temperature, the pressure between two continuous metal strips that rotate in opposite directions. To the two strips are applied a temperature and a pressure of up to 100 bar (according to the invention, wherein it is regulated between about 20 and about 100 bar, preferably between about 50 and about 80 bar) by means of heating (for example by a heated oil) up to 500° C. (according to the invention, wherein the temperature may be between about 300 and about 500° C., in particular between about 360 and about 400° C.). The press comprises a hot zone, then a cold zone at the exit to facilitate demolding. The speeds are in the range of about 0.1 to about 5 m/m in, preferably about 1 to about 2 m/m in, for a high temperature treatment duration of about 30 seconds to about 3 minutes.

Other isochoric continuous-casting technologies using similar values may be used.

The consolidation according to a semi-continuous technology, in which a pressure of between about 5 and about 50 bar may be applied, preferably between about 10 and about 25 bar, and at a temperature between about 300 and about 500° C., in particular between about 360 and about 400° C., for a passage speed of about 0.1 to about 5 m/m in, preferably about 0.4 to about 1.2 m/min, for a high temperature treatment duration of between about 30 s and about 3 min. The semi-continuous technology is based on the principle of a single-plate compression press comprising hot and cold zones. The material to be consolidated is placed between 2 metal strips which pass between the plates of the compression press. Every 5 to 20 seconds the press opens a few millimeters (5 or 10) and the strips with the material is pulled down a few centimeters (5 to 15) (by a clamp), wherein the press closes for 5 to 20 seconds. And so on. Both technologies require more or less thick metal strips and treatment with a suitable release agent.

The sheets may be evaluated with the following tests at the end of production:
  Grammage
  Thickness
  Fiber content by calcination
  Density by weighing in air and water
  Porosity by absorption of acetone after a bath of 24 hours (see procedure)
  Tensile modulus and strain in the warp and weft direction.

Routine tests based on the information contained in this application make it possible to produce sheets having the porosity according to the invention. It may be specified that the method aims to contain the consolidation within the limits required to obtain the porosity according to the invention. It is therefore advisable to choose, for a given PEI (of a certain grade, having a given implementation temperature), the correct heating temperature, so that the PEI is at a viscosity of less than or equal to 1000 Pa·s, preferably 600 Pa·s. Then, applying the heat for a treatment duration for consolidation to the desired level for obtaining porosity.

Thus, the composite sheet according to the invention may be defined as being obtained, or capable of being obtained, by a method comprising having a ply of textile structure or several superimposed plies of textile structure, preferably having undergone finishing, impregnating the sheet with PEI on one or both sides of the textile structure or the stack, softening (attaining a viscosity preferably less than or equal to 1000 Pa·s, in particular 600 Pa·s), then cooling the PEI (through powdering or filming techniques, preferably), and consolidation, in particular by a continuous or semi-continuous method, with heating in order to achieve a viscosity of preferably less than or equal to 1000 Pa·s, in particular 600 Pa·s, for about 30 s to about 3 min. The pressures and temperatures have been specified above.

In a more specific embodiment, the composite sheet may be obtained, or is capable of being obtained, by a method comprising having a one-ply textile structure or several superimposed plies of textile structure, having undergone finishing with a silane (for example aminosilane or epoxysilane), impregnate the sheet with PEI by powdering or deposition of a PEI film on one or both sides of the textile structure or the stack, softening to a viscosity of less than or equal to 1000 Pa·s, in particular 600 Pa·s, then cooling of the PEI, and consolidation, in particular by a continuous or semi-continuous method, with heating for about 30 s to about 3 min at a viscosity of less than or equal to 1000 Pa·s, in particular 600 Pa·s.

The composite sheets thus produced may be used as skins in an in-situ foaming method of thermoplastic materials, allowing an optimal evacuation of the gases during the foaming method, in particular acetone, making it possible to obtain skins without surface defects and with good tension. Surprisingly, the level of porosity according to the invention makes it possible to fulfill the objectives of the invention and, in particular, to ensure good surface tension, which does not allow more or less perfectly consolidated composite sheets, i.e. having a porosity lower than the scope of the invention.

It should be noted that the standard method for manufacturing a PEI foam sandwich between two sheets of PEI composite, usable here, is covered by (*The Development of In-Situ Foamed Sandwich Panels*, Proefschrift, 1997, Technical University of Delft, by Pieter-Willem Christiaan PROVO KLUIT, Delft University Press, Mekelweg 4, 2628 Delft CD, The Netherlands) and comprises:

Impregnation of the PEI film(s) (it is possible to use one or more superimposed films) with a foaming agent, in particular acetone; this is referred to as the core;

Constituting the sandwich by placing the core between two composite sheets according to the invention;

Placing the assembly between the two plates of a press, generally preheated;

Optionally, pre-compacting the assembly between these two plates at a temperature that is slightly lower than the glass transition temperature of the PEI/foaming agent, maintaining these conditions for a given time, then cooling to room temperature and, finally, withdrawal of the pressure; this makes it possible to improve the bond between the skins and the core and the homogeneous distribution of the foaming agent;

Proceeding to foaming; wherein the assembly is placed between the plates of the press, preferably preheated, at a temperature above the glass transition temperature while taking into account the amount of foaming agent that is typically between about 155 and about 210° C.; wherein a pressure is applied to the assembly with a typical pressure of around 40 bars; wherein the assembly is heated to the appropriate temperature for foaming, then the press is gradually opened to develop the foam; then follows the cooling step.

The method of measuring the porosity by acetone uptake may be further detailed as follows. It is derived from EN2378: fiber-reinforced plastics—Determination of water absorption by immersion.

Equipment

Glass beaker of appropriate dimensions for the number of test pieces

Thermo-regulated enclosure

Precision balance at 0.1 mg

Operating Mode

Cutting test pieces of 40×40 mm without burrs or holes (preferably at least 5 by reference)

Place the test piece in an oven for 2 hours at 70° C. to dry it

Place the test piece in a desiccator for 1 h to allow it to cool

Weigh the initial mass of the M0 test piece

Fill the beakers with a minimum of 4 ml/cm$^2$ test piece area

Place the test pieces in the beaker without them touching each other or touching the walls Close the beaker for 24 h After 24 hours, remove the test pieces from the acetone bath (more than 99% pure)

Wipe the test tube with lint-free paper

Weigh immediately and note the mass M

Complete the monitoring table and calculate the average M-M0 of all test pieces, and determine the porosity in %.

The invention will now be described in more detail using embodiments taken as non-limiting examples.

Example 1

This example is based on the use of a glass fabric made of 68 tex fiberglass E with a mean diameter of 9 µm.

This fabric has an 8H satin weave with an average thread count of 22.9 threads/cm in the warp and 21.1 threads/cm in weft in order to obtain an average grammage after treatment close to 309 g/m$^2$.

After desizing, this fabric is treated with a silane finishing bath at 0.1% by weight to reach 303 g/m$^2$.

This treated fabric is impregnated with commercial powder PEI MW 55,000 g/mol (with the GPC method calibrated with PMMA, MW 46842 g/mol, Mn 21 344 g/mol) by means of gravitational powder coating technology of 75 g/m$^2$ per side. The PEI powder is fixed on the glass fabric by softening and then the polymer is cooled.

The grammages and fiber content of the prepreg obtained were measured in 3 points according to EN2337 standard by calcination.

Sample 1: 460.2 g/m$^2$-33.1% by mass of resin
Sample 2: 456.93 g/m$^2$-32.6% by mass of resin
Sample 3: 459.4 g/m$^2$-33.3% by mass of resin
i.e. a % regularity +/−1%.

The prepreg described above is consolidated via isobaric continuous compression technology, on an installation having heating zones representing a length of about 2.2 m.

The consolidation conditions are as follows:
Temperature: 370° C.
Pressure in all areas: 70 bar
Production speed: 2 m/min The consolidated one-ply sheets have the following properties:
Average thickness=0.270 mm
Average fiber rate: 33.1%
Acetone uptake rate: 4.6% by mass
Warp direction traction modulus: 17.4 GPa
Warp direction maximum traction stress: 302 MPa Example 2

This example is based on the use of a glass fabric made of 68tex fiberglass E with a mean diameter of 9 µm.

This fabric has a 2/2 twill weave with an average thread count of 22.9 threads/cm in warp and 16 threads/cm in weft to obtain an average grammage after treatment close to 285 g/m².

After desizing, this fabric is treated with a 0.1% by weight silane base finishing bath to reach 277 g/m².

This treated fabric is impregnated with the same PEI MW powder 55,000 g/mol as in Example 1, by means of gravitational powdering technology at a rate of 68 g/m² per side. The PEI powder is fixed on the glass fabric by softening and cooling the polymer.

The grammages and fiber content of the prepreg obtained were measured in 3 points according to EN2337 standard by calcination.
Sample 1: 323.8 g/m²-33.0% by mass of resin
Sample 2: 324.1 g/m²-33.2% by mass of resin
Sample 3: 320.7 g/m²-32.6% by mass of resin
i.e. a % regularity +/−1.0%.

The prepreg described above is consolidated via a semi-continuous compression technology, comprising a heating zone with a length of about 0.6 m.

The consolidation conditions are as follows:
Temperature: 400° C.
Pressure in all zones: 15 bars
Production speed: 1.2 m/min
The one-ply sheets have the following properties:
Average thickness=0.236 mm
Average fiber rate: 32.3%
Acetone uptake rate: 4.9% by weight
Warp direction traction modulus: 21.4 GPa
Warp direction maximum traction stress: 353 MPa Example 3 (Comparative)

This example is based on the use of a glass fabric made of 68tex fiberglass E with a mean diameter of 9 μm.

This fabric has an 8H satin weave with an average thread count of 22.9 threads/cm in the warp and 21.1 threads/cm in the weft in order to obtain an average grammage after treatment close to 309 g/m².

After desizing, this fabric is treated with a silane finishing bath at 0.1% by weight to reach 303 g/m².

This treated fabric is impregnated with PEI MW 55 000 g/mol powder (as in the previous examples) by means of a gravitational powder coating technology at a rate of 75 g/m² per side. The PEI powder is fixed on the glass fabric by softening and then cooling the polymer.

The gram mages and fiber content of the prepreg obtained were measured in 3 points according to EN2337 standard by calcination.
Sample 1: 460.2 g/m²-33.1% by mass of resin
Sample 2: 456.63 g/m²-32.6% by mass of resin
Sample 3: 459.4 g/m²-33.3% by mass of resin
i.e. a % regularity +/−1%.

The prepreg described above is consolidated via a sequential compression technology, on an installation comprising 3 presses, two heated to 360° C. and one to 80° C.

The consolidated 2-ply sheets have the following properties:
Average thickness=0.45 mm
Average fiber rate: 32.3%
Acetone uptake rate: 1.75% by weight
Warp direction traction module: 17.4 GPa
Warp direction maximum traction stress: 380 MPa Example 4

The composite sheets of Examples 1 to 3 were used to produce foamed sandwich panels, according to a standard method comprising the impregnation of PEI film with acetone (the core), the formation of the sandwich by placing the core between two composite sheets according to the invention, placing the assembly between the two plates of a press, heating at a temperature above the glass transition temperature between about 155 and about 210° C. while applying pressure to the assembly, obtaining foaming, and progressive opening of the press to develop the foam, then cooling.

The composite sheets of Examples 1 and 2 made it possible to obtain sandwich panels with good adhesion between the foam core and the composite covering sheets. In contrast to the composite sheets of Examples 1 and 2, the composite sheets of Example 3 failed to obtain a good surface appearance.

The continuous or semi-continuous molding method according to Examples 1 and 2 proves to be more efficient for producing high performance composite sheets for the foamed sandwich application. A characteristic of the composite sheets produced by these methods that is different between these two groups of molding method (Examples 1 and 2 versus 3) is that, from the same grade of PEI, different acetone porosities are obtained, wherein the methods of Examples 1 and 2 lead to higher acetone porosity.

The invention claimed is:

1. A consolidated composite sheet consisting of:
at least one fabric; and
a polyetherimide (PEI) having a mass molecular weight between 20,000 g/mol and 100,000 g/mol, and the mass content of the PEI having a regularity of +/−5% of resin in mass on the whole of the sheet,
wherein the composite sheet is molded under heat and pressure and PEI impregnates and densifies the fabric, and wherein the composite sheet has an acetone absorption of from 3% to 8% by weight of acetone absorption, as measured by an acetone uptake method that consists of, on a 40×40 mm test piece of the composite sheet, dried for 2 h at 70° C.:
weighing the initial mass of the test piece;
then placing the test piece in acetone overlapping the test piece for 24 h;
recovering the test piece;
wiping the test piece;
weighing the test piece;
comparing the current mass of the test piece with the initial mass of the test piece, the difference being the weight of acetone uptaken by the test piece; and
expressing the weight of acetone uptaken as a % by weight of acetone absorption.

2. The consolidated composite sheet according to claim 1, wherein the mass content of PEI relative to the total weight of the sheet is between 20% and 50%.

3. The consolidated composite sheet according to claim 1, wherein the PEI has a mass molecular weight from 30,000 g/mol to 60,000 g/mol.

4. The consolidated composite sheet according to claim 1, wherein the PEI has a number-average molecular weight from 15,000 g/mol to 50,000 g/mol.

5. The consolidated composite sheet according to claim 1, wherein the fabric is formed of a material selected from the group consisting of glass thread, carbon, basalt, and mixtures thereof.

6. The consolidated composite sheet according to claim 1, wherein the surface weight of the glass fabric is from 50 g/m² to 600 g/m².

7. The consolidated composite sheet according to claim 1, wherein the fabric comprises threads, and the threads have a linear density of 10 tex to 300 tex in glass and 60 tex to 800 tex in carbon.

8. The consolidated composite sheet according to claim 1, comprising from 1 to 4 plies of fabric.

9. The consolidated composite sheet according to claim 1, having a thickness less than or equal to 3 mm.

10. The consolidated composite sheet according to claim 1, wherein the sheet is obtained by a method comprising:
preparing a ply of fabric or a plurality of superposed plies of fabric forming a stack;
impregnating the sheet with PEI by powdering or depositing PEI film on one or both sides of the fabric or stack;
subjecting the stack to softening; and
then cooling and consolidation, using continuous or semi-continuous molding with heating at a temperature of from 300° C. to 500° C., for a duration of 30 seconds to 3 minutes.

11. The composite sheet according to claim 10, wherein the sheet is obtained by a continuous molding method, wherein a pressure is applied between 20 bar and 100 bar, at a temperature between 300° C. and 500° C., for a passage speed of 0.1 m/min to 5 m/min, for a high temperature treatment time of between 30 seconds and 3 minutes.

12. The consolidated composite sheet according to claim 10, wherein the sheet is obtained by a semi-continuous molding method, and wherein a pressure is applied between 5 bar and 50 bar, at a temperature between 300° C. and 500° C., for a passage speed of 0.1 m/min to 5 m/min, for a high temperature treatment duration of between 30 seconds and 3 minutes.

13. The consolidated composite sheet of claim 1, having an acetone absorption of from 4% to 5%, as measured by the acetone uptake method.

14. The consolidated composite sheet according to claim 1, wherein the mass content of PEI relative to the total weight of the sheet is between 23% and 43%.

15. The consolidated composite sheet according to claim 2, wherein the mass content of PEI has a regularity of +/−2% in mass of resin on the whole of the sheet.

16. The consolidated composite sheet according to claim 1, wherein the PEI has a number-average molecular weight from 18,000 g/mol to 30,000 g/mol.

17. A method for manufacturing the consolidated composite sheet according to claim 1, comprising having one ply of fabric or several superimposed plies of fabric, impregnating the sheet with PEI by powdering or depositing a film of PEI on one or both sides of the fabric or the stack, subjecting the stack to softening, then cooling and consolidation, using continuous or semi-continuous molding with heating at a temperature of between 300° C. and 500° C., for a period between 30 seconds and 3 minutes.

18. The method according to claim 17, wherein, in the continuous molding, a pressure is applied between 20 bar and 100 bar, at a temperature between 300° C. and 500° C., for a passage speed of 0.1 m/min to 5 m/min, for a high temperature treatment time of between 30 seconds and 3 minutes.

19. The method according to claim 17, wherein, in the semi-continuous molding, is applied a pressure between 5 bar and 50 bar, at a temperature between 300° C. and 500° C., for a passage speed of 0.1 m/min to 5 m/min, for a duration of treatment at high temperature between 30 seconds and 3 minutes.

20. The method according to claim 17, wherein the PEI has a mass molecular weight (MW) of from 30,000 g/mol to 100,000 g/mol.

21. The method according to claim 17, wherein the PEI has an apparent viscosity of between 600 Pa·s and 1500 Pa·s at 360° C., as measured under a shear between $10^{-2}$ second$^{-1}$ and 1 second$^{-1}$, as measured using a two-plane Couette viscometer.

* * * * *